Dec. 29, 1925.  
J. PATTON, JR  
BANK CHECK  
Filed March 15, 1922
1,567,613
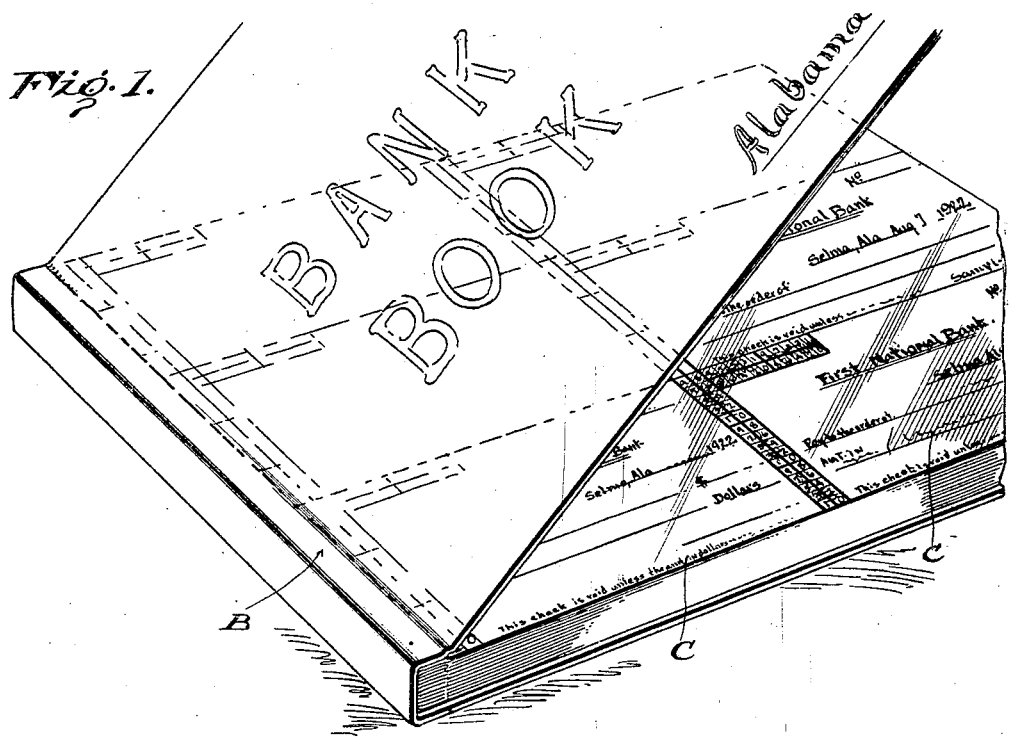
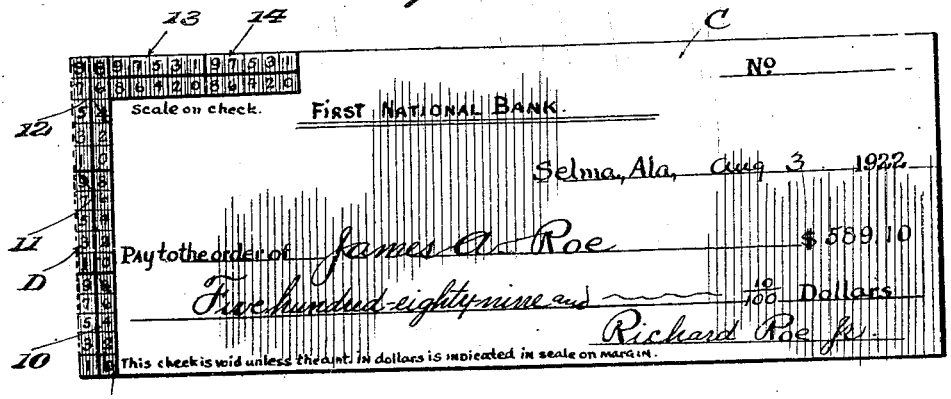
WITNESSES  
W. A. Williams
INVENTOR  
John Patton Jr.  
BY  
Munn & Co.  
ATTORNEYS Patented Dec. 29, 1925.

1,567,613

UNITED STATES PATENT OFFICE.

JOHN PATTON, JR., OF CHARLESTON, WEST VIRGINIA.

BANK CHECK.

Application filed March 15, 1922. Serial No. 543,881.

*To all whom it may concern:*

Be it known that I, JOHN PATTON, Jr., a citizen of the United States, and a resident of Charleston, in the county of Kanawha and State of West Virginia, have invented certain new and useful Improvements in Bank Checks, of which the following is a specification.

This invention relates to bank checks, drafts or the like, and particularly to a method of protecting checks, drafts etc. against changing the amount of money for which the check or draft is originally made payable.

The invention particularly relates to the type of checks or drafts upon which numerals or reference characters are utilized for indicating the amount for which the check is payable.

As is well known with this type of check the numerals which indicate the sum of money for which the check is payable are usually punched out, mutilated or otherwise marked, and the numerals adjacent those marked indicate what these numerals should be. It sometimes proves difficult to read the amount which it is intended to indicate by these numerals.

With the above in mind it is the primary object of the invention to arrange numerals or other reference characters upon a check or draft in such a manner that the same may be utilized for indicating the amount for which the check is payable without blotting out, mutilating or marking the numerals which indicate the amount of the check.

It is also an object of the invention that the numerals may be arranged upon the check in a neat and artistic manner.

It is a further important object of the invention that the numerals which indicate the amount of check may be quickly and easily read.

Other objects will hereinafter appear in the detailed description to follow.

The invention is illustrated by way of example in the accompanying drawings, in which:—

Figure 1 is a perspective view of a bankbook of well known type and showing the checks provided with numerals arranged in accordance with the present invention.

Figure 2 is a plan view of a check when removed from the bank-book.

Referring to the drawings more particularly in Figure 1, B indicates generally the bank-book of which each leaf is made up of a number of checks C, one of said checks being shown in Figure 2 and so indicated. The check C in each instance has arranged adjacent one end thereof, preferably the left hand end of the check two columns of figures, namely: D and E. These two columns of figures are made into three divisions, namely: 10, 11 and 12. In each division there is arranged the digits; cipher to nine inclusive. In one column there is arranged the even numerals including the cipher and in the other column the odd numbers. In each division the lowermost numbers should occur at the lower end of each division and progress upwardly, and as is seen by this arrangement directly opposite the cipher would occur "1" in each of the divisions, and directly opposite the digit "2" would occur the digit "3" in each of the divisions and this arrangement of the digits continues throughout each division; and along the upper edge of the check there could be arranged other divisions of digits as shown at 13 and 14.

It is intended that the numerals utilized on the check will only indicate in dollars, that is, indicate only the number of dollars for which the check is payable, and not the cents. Beginning with the division 10 of the digits, said division may be termed "units," the division 11 "tens," the division 12 "hundredths," the division 13 "thousands," and the division 12 "tens of thousands."

Assuming that the check is made payable for "$589.10" in order to protect this original sum for which the check is payable, the same should be indicated by the arrangement of numerals of the present invention. As before stated the present invention is utilized for indicating the dollars only, it not being thought essential to indicate cents on the check. To indicate the $589.10 the numeral 4 in division 12 which is the hundredths division would be "punched", "crossed out" or otherwise marked. In division 11 the numeral 9 would be "marked" or "punched"; and in division 10 the numeral 8 would be "punched" or "marked". There also might be printed upon the check the following: "This check is void unless the amount in dollars is indicated in scale on margin." This could be arranged adjacent the lower edge of the check as shown in the drawings.

When the check or draft is presented to a cashier of the bank he only needs to look for the numerals punched and read the numerals directly opposite thereto to ascertain the amount for which the check was originally drawn. By arranging the numerals in two columns, as shown, this act upon the part of the cashier may be accomplished in an accurate and exceedingly quick manner. It is of course to be understood that the different divisions of digits of numerals may be continued along the upper edge of the check so that any amount desired in dollars may be indicated. Also it is obvious that if desired a division may be set aside for indicating the cents the check may call for.

I claim:—

1. The method for protecting checks or the like which consists in arranging upon the check divisions of numerals, each division consisting in two columns and said numerals of each division representing the ten digits, all odd numerals of each division occurring in one column and arranged in successive order, and all even numerals occurring in the other column and arranged in the same order and then obliterating the numerals in the divisions which are opposite to those intended to be read for indicating the amount of the check.

2. A check having a plurality of divisions of numerals arranged thereon, each division consisting in two columns of numerals, and the numerals consisting in the ten digits, said digits being arranged so that all even numerals will occur in one column and all uneven numerals in the other column, and said numerals in each column occurring in successive order.

JOHN PATTON, Jr.